United States Patent
Lowson et al.

(10) Patent No.: US 10,620,022 B2
(45) Date of Patent: Apr. 14, 2020

(54) FLOW METER AND METHOD FOR MEASURING FLUID FLOW

(71) Applicants: Paul Lowson, Houston, TX (US); Daniel Cousin, Humble, TX (US); Justin Brough, Tomball, TX (US)

(72) Inventors: Paul Lowson, Houston, TX (US); Daniel Cousin, Humble, TX (US); Justin Brough, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/917,057

(22) Filed: Mar. 9, 2018

(65) Prior Publication Data

US 2019/0277673 A1 Sep. 12, 2019

(51) Int. Cl.
*G01F 1/11* (2006.01)
*G01F 1/115* (2006.01)
*E21B 47/10* (2012.01)

(52) U.S. Cl.
CPC .............. *G01F 1/115* (2013.01); *E21B 47/10* (2013.01)

(58) Field of Classification Search
CPC . G01F 1/11; E21B 47/10; A61M 1/10; H02K 1/27
See application file for complete search history.

(56) References Cited

U.S. PATENT DOCUMENTS

| | | | |
|---|---|---|---|
| 4,265,127 A | 5/1981 | Onoda | |
| 4,367,413 A | 1/1983 | Nair | |
| 5,216,924 A | 6/1993 | Le Breton | |
| 5,433,118 A | 7/1995 | Castillo | |
| 5,689,071 A * | 11/1997 | Ruffner | G01F 1/115 |
| | | | 73/861.84 |
| 6,027,318 A * | 2/2000 | Shimanuki | F04C 2/00 |
| | | | 417/420 |
| 6,388,346 B1 | 5/2002 | Lopatinsky et al. | |
| 6,543,992 B2 * | 4/2003 | Webster | F01D 11/20 |
| | | | 415/10 |
| 6,889,544 B2 | 5/2005 | Tanimoto et al. | |
| 7,033,147 B2 | 4/2006 | Yanai et al. | |
| 8,632,449 B2 * | 1/2014 | Masuzawa | A61M 1/1086 |
| | | | 600/17 |
| 8,646,327 B2 | 2/2014 | Wootten | |
| 8,800,384 B2 | 8/2014 | Wootten | |
| 10,124,350 B2 * | 11/2018 | Cai | B05B 1/18 |

(Continued)

FOREIGN PATENT DOCUMENTS

| | | |
|---|---|---|
| CN | 2555499 Y | 6/2003 |
| CN | 201731897 U | 2/2011 |

(Continued)

OTHER PUBLICATIONS

International Search Report and Written Opinion for International Application No. PCT/US2019/021342; International Filing Date Mar. 8, 2019; Report dated Jun. 24, 2019 (pp. 1-10).

*Primary Examiner* — Jewel V Dowtin

(74) *Attorney, Agent, or Firm* — Cantor Colburn LLP

(57) ABSTRACT

A downhole flow meter includes a body including an inlet exposed to downhole fluids, an impeller rotatably supported in the body, the impeller including at least one vane, at least one magnet mounted to the at least one vane, and a switch responsive to the at least one magnet arranged in the body.

20 Claims, 5 Drawing Sheets

(56) References Cited

U.S. PATENT DOCUMENTS

| | | |
|---|---|---|
| 2010/0154530 A1 | 6/2010 | Oddie |
| 2012/0011928 A1 | 1/2012 | Wootten |
| 2012/0158308 A1 | 6/2012 | Wootten |
| 2015/0035415 A1* | 2/2015 | Zang ........................ H02K 1/27 310/68 R |
| 2016/0130935 A1 | 5/2016 | Manzar et al. |
| 2017/0227388 A1 | 8/2017 | Vigneaux et al. |
| 2017/0350405 A1* | 12/2017 | Sozer ....................... F04D 17/10 |

FOREIGN PATENT DOCUMENTS

| | | |
|---|---|---|
| GB | 2102129 A | 1/1983 |
| JP | 2001165734 A | 6/2001 |
| WO | 0163221 A1 | 8/2001 |

* cited by examiner

FLOW METER AND METHOD FOR MEASURING FLUID FLOW

BACKGROUND

In the resource exploration and recovery industry, flow meters are commonly used to measure fluid flow through a tubular. The fluid flow may represent treatment fluids that are being introduced into a formation. Typically, the flow meter is located along a tubular extending into a formation. The flow meter typically includes an encoder that is connected to a surface system by a plurality of conductors. Typically, at least two conductors extend from the surface system to each flow meter.

Each wire requires an intrusion or opening into the tubular to connect with the encoder. Each intrusion represents a potential failure point. Vibration may create friction that wears on conductor insulation that may create an open. Therefore, each intrusion includes a protective element that shields the conductor from downhole vibrations. Failure of a conductor renders a flow meter inoperable. Therefore, the art would be appreciative of a system that would reduce an overall number of conductors that extend downhole and connect with flow meters.

SUMMARY

Disclosed is a flow sensor includes an impeller having at least one vane, at least one magnet mounted to the at least one vane, and a switch responsive to the at least one magnet arranged in the body.

Also disclosed is a resource recovery and exploration system including a first system, a second system including at least one tubular fluidically connected to the first system. The at least one tubular includes a downhole flow meter including a flow sensor having an impeller including at least one vane, at least one magnet mounted to the at least one vane, and a switch responsive to the at least one magnet arranged in the body.

Further disclosed is a method for sensing flow in a downhole tubular including introducing a flow of fluid towards a downhole flow meter, rotating an impeller including at least one vane with the flow of fluid, activating a switch with a magnet mounted to the at least one vane, and determining a velocity of the flow of fluid based on activations of the switch.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
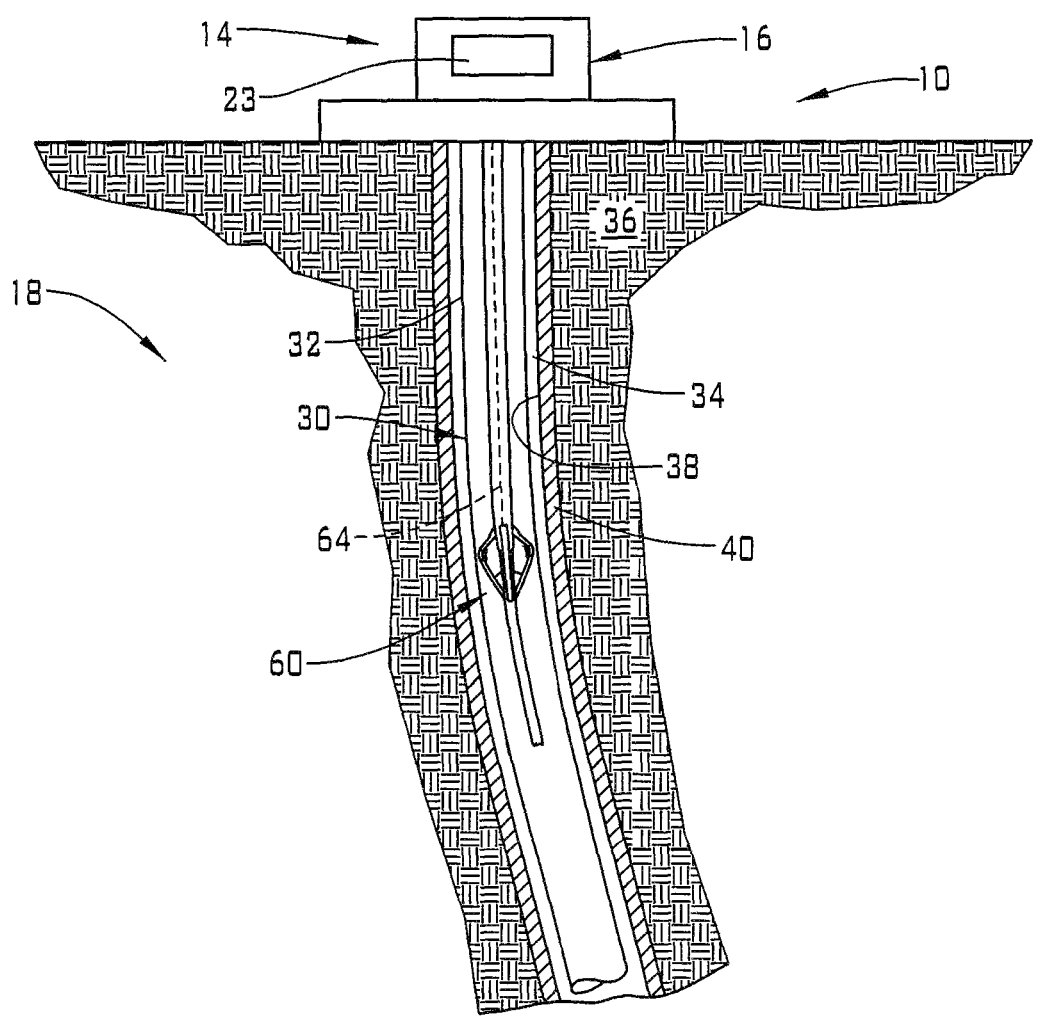
FIG. 1 depicts a resource exploration and recovery system including a downhole flow meter, in accordance with an aspect of an exemplary embodiment.

A resource exploration and recovery system, in accordance with an exemplary embodiment, is indicated generally at 10, in FIG. 1. Resource exploration and recovery system 10 should be understood to include well drilling operations, resource extraction and recovery, $CO_2$ sequestration, and the like. Resource exploration and recovery system 10 may include a first system 14 which, in some environments, may take the form of a surface system 16 operatively and fluidically connected to a second system 18 which, in some environments, may take the form of a downhole system. First system 14 may include a control system 23 that may provide power to, monitor, communicate with, and/or activate one or more downhole operations as will be discussed herein. Surface system 16 may include additional systems such as pumps, fluid storage systems, cranes and the like (not shown).

Second system 18 may include a tubular string 30, formed from one or more tubulars 32, which extends into a wellbore 34 formed in formation 36. Wellbore 34 includes an annular wall 38 which may be defined by a surface of formation 36, or a casing tubular 40 such as shown. In an embodiment, a downhole flow meter 60 may be provided in tubular string 30. Downhole flow meter 60, as will be detailed herein, is connected to first system 14, such as to control system 23 by a single conductor 64.

Figure 2:
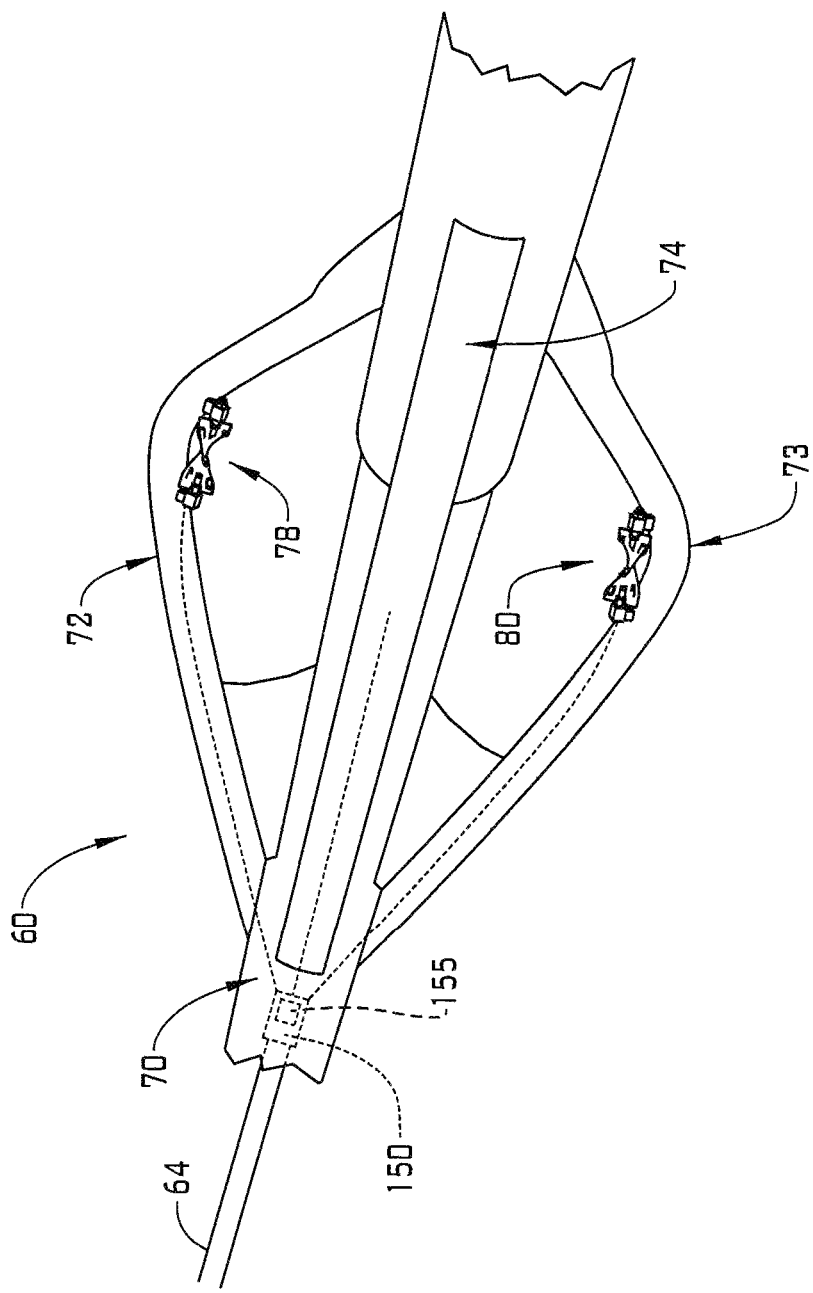
FIG. 2 depicts a downhole flow meter, in accordance with an aspect of an exemplary embodiment.

Referring to FIG. 2, downhole flow meter 60 includes a body 70 that supports a number of radially outwardly extending arm members 72, 73, and 74 each supporting a corresponding flow sensor, two of which are indicated at 78 and 80, that detect a flow of downhole fluids. At this point, it should be understood that the number of arm members may vary. It should also be understood that flow sensors may be arranged in other location of downhole member 60. Downhole fluids should be understood to include fluids introduced from surface system 16 into tubular string 30 and fluids passing from formation 36 into tubular string 30.

Figure 3:
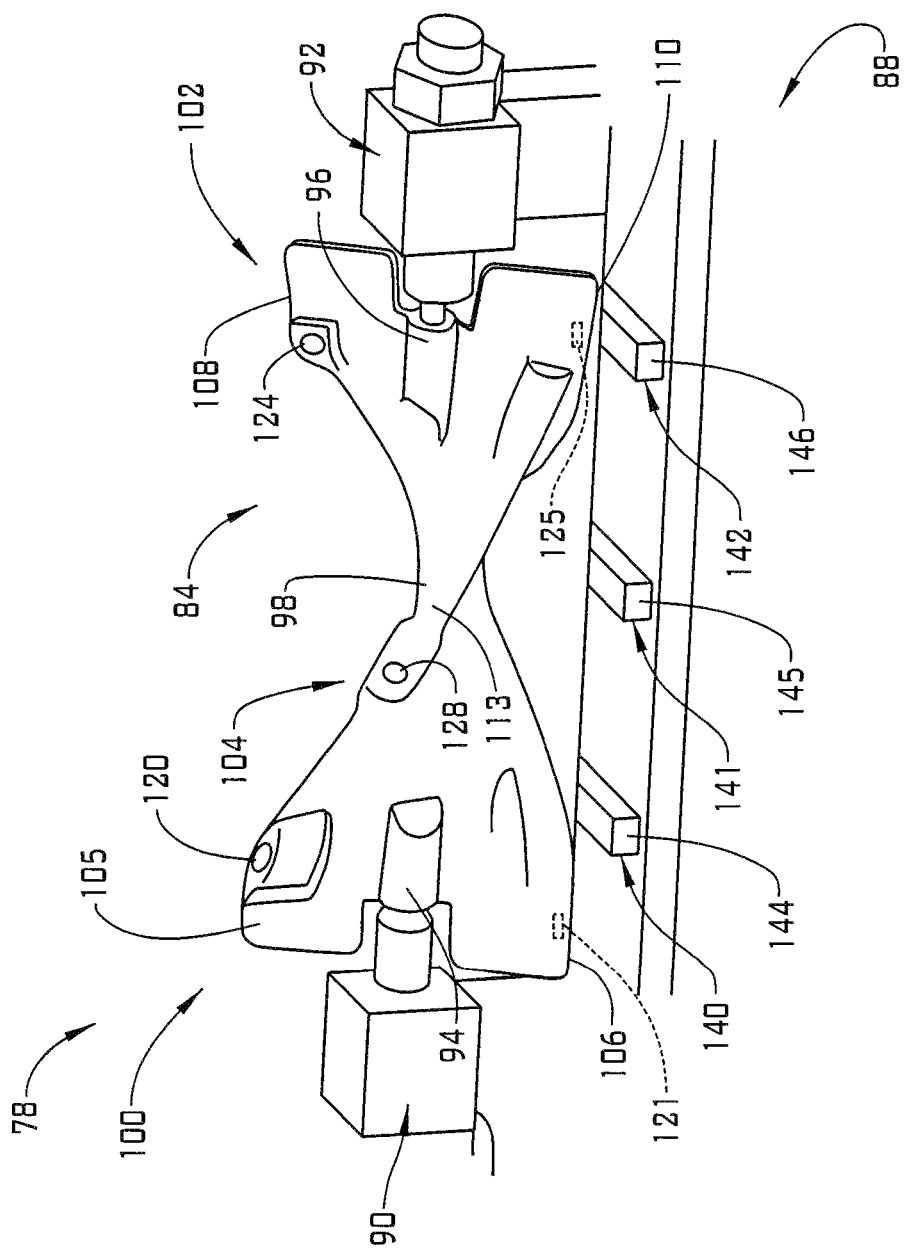
FIG. 3 depicts an impeller of the downhole flow meter of FIG. 2, in accordance with an aspect of an exemplary embodiment.

A detailed description will follow with respect flow sensor 78 with an understanding that flow sensor 80 and other flow sensors (not shown) may include similar structure. As shown in FIG. 3, and with continued reference to FIG. 2, flow sensor 78 includes an impeller 84 that is acted upon by the downhole fluids. Rotation of impeller 84 may be correlated to a flow velocity of the downhole fluids as will be detailed herein. Impeller 84 includes a support mechanism 88 arranged upon arm member 72. Support mechanism 88 includes a first support member 90 and a second support member 92 that support impeller 84 for rotation relative to arm member 72.

Impeller 84 includes a first end 94, a second end 96, and an intermediate portion 98. A first vane 100 is arranged at first end 94, a second vane 102 is arranged at second end 96, and a third vane 104 may be arranged at intermediate portion 98. The number, location, and arrangement of vanes may vary. First vane 100 includes a first radially outwardly facing edge 105 and a second radially outwardly facing edge 106. Second vane 102 includes a third radially outwardly facing edge 108 and a fourth radially outwardly facing edge 110. Third vane 104 includes a fifth radially outwardly facing edge 113 and a sixth radially outwardly facing edge (not shown).

In an embodiment, a first magnet pair (not separately labeled) is mounted to first vane 100. The first magnet pair includes a first magnet 120 arranged at first radially outwardly facing edge 105 and a second magnet 121 arranged at second radially outwardly facing edge 106. A second magnet pair (not separately labeled) is provided on second vane 102. The second magnet pair includes a third magnet 124 arranged at third radially outwardly facing edge 109 and a fourth magnet 125 arranged at fourth radially outwardly facing edge 110. A third magnet pair (not separately labeled) is provided at third vane 104. The third magnet pair includes a fifth magnet 128 arranged at fifth radially outwardly facing edge 113 and a sixth magnet (not shown) arranged at the sixth radially outwardly facing edge.

At this point, it should be understood that the number and location of magnets may vary. Further, it should be understood that the orientation of the magnets may vary. In an embodiment, each magnet pair includes a magnet having an outwardly facing north pole and a magnet having an outwardly facing south pole. Magnets may be formed from a variety of materials including rare earth elements such as neodymium, samarium, and cobalt as well as ferrous-based elements and the like.

Figure 4:
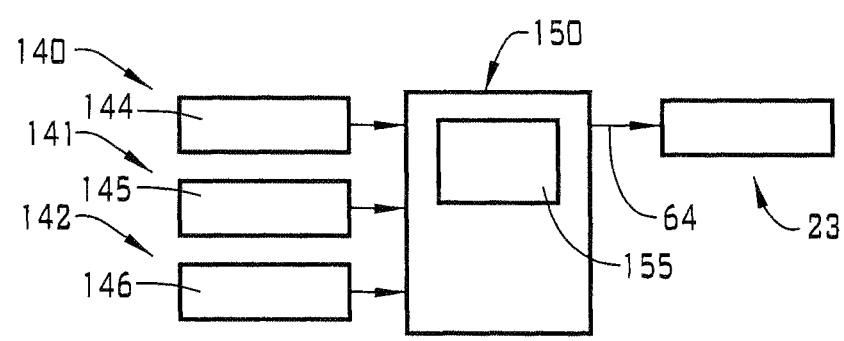
FIG. 4 depicts a block diagram illustrating a control system for the flow meter, in accordance with an aspect of an exemplary embodiment.

In an embodiment, each magnet pair is associated with a corresponding switch. For example, first and second magnets 120 and 121 may act upon a first switch 140, third and fourth magnets 124 and 125 may act upon a second switch 141 and fifth and sixth magnets 128 and 129 may act upon a third switch 142. In an embodiment, first switch 140 may take the form of a first Hall Effect switch 144, second switch 141 may take the form of a second Hall Effect switch 145 and third switch 142 may take the form of a third Hall Effect switch 146. As shown in FIG. 4, each switch 140-142 is connected to a circuit board 150 (FIG. 2) that may include a signal conditioning module 155 such as shown in FIG. 3. Circuit board 150 may be connected to control system 23 through single conductor 64.

Figure 5:
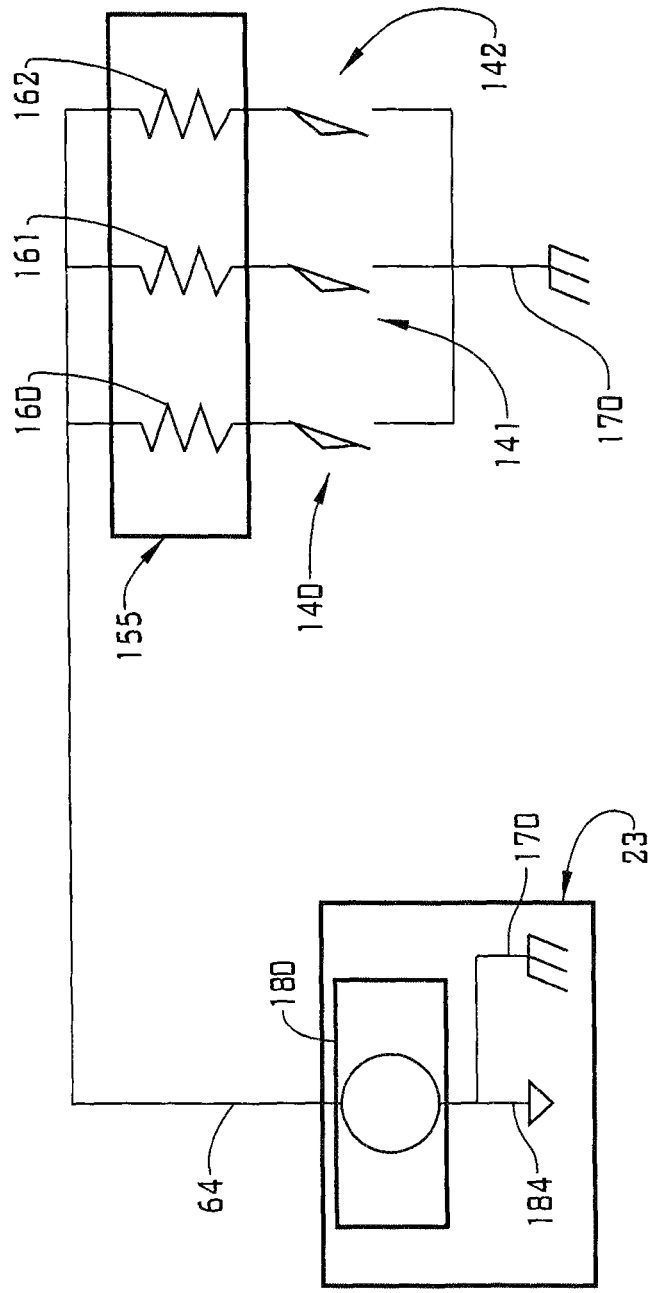
FIG. 5 depict a circuit diagram of the switches of FIG. 4, in accordance with an aspect of an exemplary embodiment.

In an embodiment shown in FIG. 5, signal conditioning module 155 may include a first resistor 160 connected to first switch 140, a second resistor 161 connected to second switch 141 and a third resistor 162 connected to third switch 142. Each resistor 160-162 may include a distinct resistance value. Each switch 140-142 may be connected to ground 170 through, for example, tubular string 30. In this manner, signals passing from each switch 140-142 in response to first, second and third magnet pairs may include a different wave form. Thus, single conductor 64 may pass the signals to control system 23 which may also be connected to ground 170 through tubular string 30 and, to a separate ground 184. Control system 23 may then, in turn differentiate between signals sent from each switch 140-142 to determine a rotational speed and direction of impeller 84. The rotational speed and direction of impeller 84 may be correlated to a flow velocity and flow direction of fluid passing through body 70.

At this point, it should be appreciate that the exemplary embodiments describe a system and method for measuring flow, both direction and velocity, in a tubular. The system employs a single conductor that extends between a flow meter and a control system. The flow meter includes an impeller fitted with magnets that move relative to and act upon switches. A signal conditioning module adjusts a signal from each switch. The signal is sent to a surface system for evaluation.

Set forth below are some embodiments of the foregoing disclosure:

Embodiment 1: A flow sensor including an impeller including at least one vane, at least one magnet mounted to the at least one vane and a switch responsive to the at least one magnet arranged in the body.

Embodiment 2: The flow sensor according to any prior embodiment, wherein the at least one vane includes a first radially outwardly facing edge and a second, opposing, radially outwardly facing edge, the at least one magnet including a first magnet mounted to the first radially outwardly facing edge and a second magnet mounted to the second radially outwardly facing edge.

Embodiment 3: The flow sensor according to any prior embodiment, wherein a north pole of the first magnet is selectively exposed to the switch and a south pole of the second magnet is selectively exposed to the switch.

Embodiment 4: The flow sensor according to any prior embodiment, wherein the at least one vane includes a first vane, a second vane and a third vane, each of the first vane, second vane and third vane including a magnet.

Embodiment 5: The flow sensor according to any prior embodiment, wherein the first vane includes first and second magnets, the second vane includes third and fourth magnets, and the third vane includes fifth and sixth magnets.

Embodiment 6: The flow sensor according to any prior embodiment, wherein the switch includes a first switch responsive to the first and second magnet, a second switch responsive to the third and fourth magnets, and a third switch responsive to the fifth and sixth magnets.

Embodiment 7: The flow sensor according to any prior embodiment, wherein the second switch is circumferentially spaced from the first switch by a first angle and the third switch is circumferentially spaced from the second switch and the first switch by a second angle.

Embodiment 8: The flow sensor according to any prior embodiment, further comprising: a circuit module operatively connected to the switch, the circuit module being connected to a surface system by a single conductor.

Embodiment 9: A resource recovery and exploration system including a first system, a second system including at least one tubular fluidically connected to the first system, the at least one tubular including a downhole flow meter having at least one flow sensor including an impeller including at least one vane at least one magnet mounted to the at least one vane and a switch responsive to the at least one magnet arranged in the body.

Embodiment 10: The resource recovery and exploration system according to any prior embodiment, wherein the at least one vane includes a first radially outwardly facing edge and a second, opposing, radially outwardly facing edge, the at least one magnet including a first magnet mounted to the first radially outwardly facing edge and a second magnet mounted to the second radially outwardly facing edge.

Embodiment 11: The resource recovery and exploration system according to any prior embodiment, wherein a north pole of the first magnet is selectively exposed to the switch and a south pole of the second magnet is selectively exposed to the switch.

Embodiment 12: The resource recovery and exploration system according to any prior embodiment, wherein the at least one vane includes a first vane, a second vane and a third vane, each of the first vane, second vane and third vane including a magnet.

Embodiment 13: The resource recovery and exploration system according to any prior embodiment, wherein the first vane includes first and second magnets, the second vane includes third and fourth magnets, and the third vane includes fifth and sixth magnets.

Embodiment 14: The resource recovery and exploration system according to any prior embodiment, wherein the switch includes a first switch responsive to the first and second magnet, a second switch responsive to the third and fourth magnets, and a third switch responsive to the fifth and sixth magnets.

Embodiment 15: The resource recovery and exploration system according to any prior embodiment, wherein the second switch is circumferentially spaced from the first switch by a first angle and the third switch is circumferentially spaced from the second switch and the first switch by a second angle.

Embodiment 16: The resource recovery and exploration system according to any prior embodiment, further comprising: a circuit module operatively connected to the switch, the circuit module being connected to the first system by a single conductor.

Embodiment 17: A method for sensing flow in a downhole tubular including introducing a flow of fluid toward a downhole flow meter, rotating an impeller including at least one vane with the flow of fluid, activating a switch with a magnet mounted to the at least one vane and determining a velocity of the flow of fluid based on activations of the switch.

Embodiment 18: The method of any prior embodiment, further including passing signals from the switch to a surface system through a single conductor connected to the switch.

Embodiment 19: The method of any prior embodiment, wherein rotating the impeller with at least one vane includes rotating an impeller with a first vane supporting first and second magnets, a second vane supporting third and fourth magnets, and a third vane supporting fifth and sixth magnets.

Embodiment 20: The method of any prior embodiment, further including activating a first switch with the first magnet, activating a second switch, circumferentially spaced from the first switch, with the second magnet, and activating a third switch circumferentially spaced from the first switch and the second switch with the third magnet.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A flow sensor comprising:
   an impeller including a first vane, a second vane and a third vane;
   first and second magnets mounted to each of the first vane, the second vane and the third vane; and
   a plurality of sensors responsive to the first and second magnets arranged on corresponding ones of the first vane, the second vane, and the third vane.

2. The flow sensor according to claim 1, wherein the first vane includes a first radially outwardly facing edge and a second, opposing, radially outwardly facing edge, the first magnet is mounted to the first radially outwardly facing edge and the second magnet is mounted to the second radially outwardly facing edge.

3. The flow sensor according to claim 2, wherein a north pole of the first magnet is selectively exposed to the corresponding one of the plurality of sensors and a south pole of the second magnet is selectively exposed to the corresponding one of the plurality of sensors.

4. The flow sensor according to claim 1, wherein the plurality of sensors includes a first sensor responsive to the first and second magnets of the first vane, a second sensor responsive to the first and second magnets mounted to the second vane, and a third sensor responsive to the first and second magnets mounted to the third vane.

5. The flow sensor according to claim 4, wherein the first magnet on the first vane is circumferentially spaced from the first magnet on the second vane by a first angle and the first magnet on the second vane is circumferentially spaced from the first magnet on the the third vane by a second angle.

6. The flow sensor according to claim 1, further comprising: a circuit module operatively connected to the plurality of sensors, the circuit module being connected to a surface system by a single conductor.

7. A resource recovery and exploration system comprising:
   a first system;
   a second system including at least one tubular fluidically connected to the first system, the at least one tubular including a downhole flow meter having at least one flow sensor comprising:
   an impeller including at least one vane;
   at least one magnet mounted to the at least one vane; and
   at least one sensor responsive to the at least one magnet arranged in the body.

8. The resource recovery and exploration system according to claim 7, wherein the at least one vane includes a first radially outwardly facing edge and a second, opposing, radially outwardly facing edge, the at least one magnet including a first magnet mounted to the first radially outwardly facing edge and a second magnet mounted to the second radially outwardly facing edge.

9. The resource recovery and exploration system according to claim 8, wherein a north pole of the first magnet is selectively exposed to the at least one sensor and a south pole of the second magnet is selectively exposed to the at least one sensor.

10. The resource recovery and exploration system according to claim 7, wherein the at least one vane includes a first vane, a second vane and a third vane, each of the first vane, second vane and third vane including a magnet.

11. The resource recovery and exploration system according to claim 10, wherein the first vane includes first and second magnets, the second vane includes third and fourth magnets, and the third vane includes fifth and sixth magnets.

12. The flow sensor according to claim 11, wherein the at least one sensor includes a first sensor responsive to the first and second magnet, a second sensor responsive to the third and fourth magnets, and a third sensor responsive to the fifth and sixth magnets.

13. The resource recovery and exploration system according to claim 12, wherein the second magnet is circumferentially spaced from the first magnet by a first angle and the third magnet is circumferentially spaced from the second magnet and the first magnet by a second angle.

14. The resource recovery and exploration system according to claim 7, further comprising: a circuit module operatively connected to the plurality of sensors, the circuit module being connected to the first system by a single conductor.

15. A method for sensing flow in a downhole tubular comprising:
introducing a flow of fluid toward a downhole flow meter;
rotating an impeller including at least one vane with the flow of fluid;
activating a sensor with a magnet mounted to the at least one vane; and
determining a velocity of the flow of fluid based on activations of the sensor.

16. The method of claim 15, further comprising: passing signals from the sensor to a surface system through a single conductor connected to the sensor.

17. The method of claim 15, wherein rotating the impeller with at least one vane includes rotating an impeller with a first vane supporting first and second magnets, a second vane supporting third and fourth magnets, and a third vane supporting fifth and sixth magnets.

18. The method of claim 17, further comprising: activating a first sensor with the first magnet, activating a second sensor with a second magnet, circumferentially spaced from the first magnet, and activating a third sensor with a third magnet circumferentially spaced from the first magnet and the second magnet.

19. The flow sensor according to claim 1, wherein each of the plurality of sensors comprise hall effect sensors.

20. The resource recovery and exploration system according to claim 7, wherein each of the plurality of sensors comprise hall effect sensors.

* * * * *